United States Patent
Wang et al.

(10) Patent No.: US 12,534,254 B2
(45) Date of Patent: Jan. 27, 2026

(54) YARN SPINDLE PACKAGING SYSTEM, CONTROL METHOD THEREFOR, ELECTRONIC DEVICE AND STORAGE MEDIUM

(71) Applicant: ZHEJIANG HENGYI PETROCHEMICAL CO., LTD., Hangzhou (CN)

(72) Inventors: Peng Wang, Hangzhou (CN); Yibo Qiu, Hangzhou (CN); Xiantao Peng, Hangzhou (CN); Zhongliang Wu, Hangzhou (CN); Dake Li, Hangzhou (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 0 days.

(21) Appl. No.: 18/733,998

(22) Filed: Jun. 5, 2024

(65) Prior Publication Data

US 2025/0100736 A1 Mar. 27, 2025

(30) Foreign Application Priority Data

Sep. 21, 2023 (CN) .................. 202311225894.X

(51) Int. Cl.
*B65B 57/14* (2006.01)
*B65B 5/04* (2006.01)
(Continued)

(52) U.S. Cl.
CPC .............. *B65B 57/14* (2013.01); *B65B 5/045* (2013.01); *B65B 35/10* (2013.01); *B65B 59/001* (2019.05); *B65G 1/1378* (2013.01)

(58) Field of Classification Search
CPC .......... B65B 19/34; B65B 35/10; B65B 5/045; B65B 5/068; B65B 57/14; B65B 59/001;
(Continued)

(56) References Cited

U.S. PATENT DOCUMENTS

| | | | |
|---|---|---|---|
| 5,289,983 A * | 3/1994 | Ueda | B65H 67/063 209/927 |
| 5,337,967 A * | 8/1994 | Teich | B65H 67/064 242/473.6 |

(Continued)

FOREIGN PATENT DOCUMENTS

| | | |
|---|---|---|
| CN | 106927090 A | 7/2017 |
| CN | 108528879 A | 9/2018 |

(Continued)

OTHER PUBLICATIONS

Machine translation of CN 116605464 (Year: 2023).*

(Continued)

*Primary Examiner* — Himchan Song
(74) *Attorney, Agent, or Firm* — Banner & Witcoff, Ltd.

(57) ABSTRACT

Provided is a yarn spindle packaging system, a control method therefor, an electronic device and a storage medium, relating to the field of chemical fiber intelligent technology. The yarn spindle packaging system includes: a control device and a plurality of stand-alone devices, where the control device is configured to generate a packaging task and a device control parameter of each stand-alone device for a target type of yarn spindles according to a packaging requirement; and adjust the packaging task and the device control parameter of each stand-alone device in combination with work data returned by each stand-alone device; and each stand-alone device is configured to receive the corresponding packaging task and device control parameter sent by the control device; execute the corresponding packaging task based on the corresponding device control parameter;

(Continued)

and return the work data corresponding to the corresponding packaging task to the control device.

10 Claims, 9 Drawing Sheets

(51) Int. Cl.
    *B65B 35/10*     (2006.01)
    *B65B 59/00*     (2006.01)
    *B65G 1/137*     (2006.01)

(58) Field of Classification Search
    CPC .... B65B 59/003; B65G 1/1378; G01G 19/52; G05B 19/41865; G05B 19/41875; G05B 2219/45048
    See application file for complete search history.

(56) References Cited

U.S. PATENT DOCUMENTS

| | | | | |
|---|---|---|---|---|
| 5,381,340 | A * | 1/1995 | Ueda | D01G 31/006 700/109 |
| 5,900,553 | A * | 5/1999 | Hasegawa | B65H 63/00 73/660 |
| 11,459,676 | B2 * | 10/2022 | Archontopoulos | B65H 67/063 |
| 11,479,379 | B1 * | 10/2022 | Gasperino | B65B 57/12 |
| 2023/0127643 | A1 * | 4/2023 | Ghiotti | B65B 65/00 53/396 |
| 2023/0297112 | A1 * | 9/2023 | Takao | B66F 9/0755 701/25 |

FOREIGN PATENT DOCUMENTS

| | | | | |
|---|---|---|---|---|
| CN | 108803521 | A | | 11/2018 |
| CN | 110950181 | A | | 4/2020 |
| CN | 210681425 | U | | 6/2020 |
| CN | 113753307 | A | | 12/2021 |
| CN | 113895935 | A | | 1/2022 |
| CN | 216186635 | U | | 4/2022 |
| CN | 115180201 | A | | 10/2022 |
| CN | 115817939 | A | | 3/2023 |
| CN | 116605464 | A * | 8/2023 | ............ B65B 35/36 |
| JP | 1980005325 | | | 1/1980 |
| JP | 198739434 | | | 2/1987 |
| JP | 1989009111 | | | 1/1989 |
| JP | 2022501745 | | | 1/2022 |

OTHER PUBLICATIONS

Feb. 5, 2025—EP24180032.5—European Extended Search Report.
JP2024-147434—Allowance and Translation, year: 2024.
JP2024147434—First Office Action and Translation, year: 2024.
Jun. 20, 2025—CN202311225894X—First Office Action, Search Report and Translation.

* cited by examiner

YARN SPINDLE PACKAGING SYSTEM, CONTROL METHOD THEREFOR, ELECTRONIC DEVICE AND STORAGE MEDIUM

CROSS-REFERENCE TO RELATED APPLICATIONS

The present application claims priority to Chinese Patent Application No. CN202311225894.X, filed with the China National Intellectual Property Administration on Sep. 21, 2023, the disclosure of which is hereby incorporated herein by reference in its entirety.

TECHNICAL FIELD

The present disclosure relates to the field of chemical fiber intelligent technology, and in particular to a yarn spindle packaging system, and a control method and control apparatus therefor.

BACKGROUND

In the yarn spindle packaging process, multiple types of yarn spindles need to be packaged. If unified packaging parameters are used to package different types of yarn spindles, the packaging damage, packaging failure, etc. will occur, affecting the packaging quality and efficiency of yarn spindles. If different stand-alone devices are customized for different types of yarn spindles, the packaging cost of the yarn spindles will be relatively high. Therefore, how to achieve efficient packaging of yarn spindles has become an urgent technical problem to be solved.

SUMMARY

The present disclosure provides a yarn spindle packaging system, and a control method and control apparatus therefor.

According to a first aspect of the present disclosure, provided is a yarn spindle packaging system, including a control device and a plurality of stand-alone devices;
the control device is configured to generate a packaging task and a device control parameter of each stand-alone device for a target type of yarn spindles according to a packaging requirement; and adjust the packaging task and the device control parameter of each stand-alone device in combination with work data returned by each stand-alone device; and
each stand-alone device is configured to receive the corresponding packaging task and device control parameter sent by the control device; execute the corresponding packaging task based on the corresponding device control parameter; and return the work data corresponding to the corresponding packaging task to the control device;
where packaging of different target types of yarn spindles is able to share the control device and at least some of the plurality of stand-alone devices.

According to a second aspect of the present disclosure, provided is a control method for a yarn spindle packaging system, including:
generating a packaging task and a device control parameter of each stand-alone device for a target type of yarn spindles according to a packaging requirement;
sending the corresponding packaging task and device control parameter to each stand-alone device, so that each stand-alone device executes the corresponding packaging task based on the corresponding device control parameter;
receiving work data corresponding to the corresponding packaging task returned by each stand-alone device; and
adjusting the packaging task and the device control parameter of each stand-alone device in combination with the work data returned by each stand-alone device, and sending a corresponding latest packaging task and a corresponding latest device control parameter to each stand-alone device;
where the yarn spindle packaging system is the yarn spindle packaging system as described in the first aspect.

According to a third aspect of the present disclosure, provided is a control apparatus for a yarn spindle packaging system, including:
a generating module configured to generate a packaging task and a device control parameter of each stand-alone device for a target type of yarn spindles according to a packaging requirement;
an adjustment module configured to adjust the packaging task and the device control parameter of each stand-alone device in combination with work data returned by each stand-alone device; and
a sending module configured to send the corresponding packaging task and device control parameter to each stand-alone device, so that each stand-alone device executes the corresponding packaging task based on the corresponding device control parameter;
where the yarn spindle packaging system is the yarn spindle packaging system as described in the first aspect.

According to a fourth aspect of the present disclosure, provided is an electronic device, including:
at least one processor; and
a memory connected in communication with the at least one processor;
where the memory stores an instruction executable by the at least one processor, and the instruction, when executed by the at least one processor, enables the at least one processor to execute the method of any embodiment of the present disclosure.

According to a fifth aspect of the present disclosure, provided is a non-transitory computer-readable storage medium storing a computer instruction thereon, and the computer instruction is used to cause a computer to execute the method according to any one of the embodiments of the present disclosure.

According to the technology of the present disclosure, the packaging task and device control parameter of each stand-alone device can be generated for different types of yarn spindles according to the packaging requirement, and each stand-alone device executes the corresponding packaging task based on the corresponding device control parameter. The adjustment based on the packaging task and device control parameter realizes intelligent packaging of different types of yarn spindles and improves the intelligence and flexibility of the yarn spindle packaging system, thereby improving the packaging efficiency of yarn spindles.

It should be understood that the content described in this summary is not intended to limit critical or essential features of embodiments of the present disclosure, nor is it used to limit the scope of the present disclosure. Other features of the present disclosure will be easily understood through the following description.

BRIEF DESCRIPTION OF THE DRAWINGS

The above and other features, advantages and aspects of various embodiments of the present disclosure will become more apparent with reference to the following detailed description in combination with the accompanying drawings. In the accompanying drawings, the same or similar reference numbers represent the same or similar elements.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The terms such as "first", "second" and "third" in the embodiments of the specification, the claims and the above-mentioned drawings in the present disclosure are used to distinguish the similar objects, but not necessarily to describe a particular order or sequence. In addition, the terms "include" and "have" and any variations thereof are intended to cover a non-exclusive inclusion. For example, a method, system, product or device containing a series of steps or units is not necessarily limited to those steps or units listed clearly, but may include other steps or units that are not listed clearly or that are inherent to the process, method, product or device.

In the related art, there are many types of yarn spindles on the market. If many types of yarn spindle packaging lines are customized for different types of yarn spindles, the packaging cost of the yarn spindles will be relatively high.

In order to at least partially solve one or more of the above problems and other potential problems, the present disclosure proposes a yarn spindle packaging system, and a control method and control apparatus therefor. By generating the packaging task and device control parameter of each stand-alone device for different types of yarn spindles according to the packaging requirement, each stand-alone device executes the corresponding packaging task based on the corresponding device control parameter. The adjustment based on the packaging task and device control parameter realizes intelligent packaging of different types of yarn spindles and can improve the intelligence and flexibility of the yarn spindle packaging system, thereby improving the packaging efficiency of yarn spindles and saving the packaging cost of yarn spindles.

Figure 1:
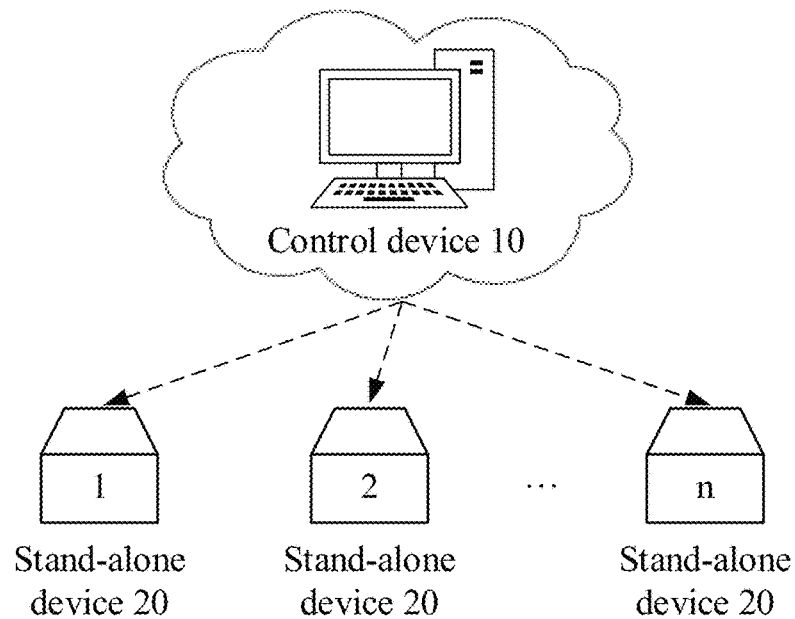
FIG. 1 is a schematic structural diagram of a yarn spindle packaging system according to an embodiment of the present disclosure.

An embodiment of the present disclosure provides a yarn spindle packaging system, as shown in FIG. 1, including a control device 10 and a plurality of stand-alone devices 20.

The control device 10 is configured to generate a packaging task and a device control parameter of each stand-alone device for a target type of yarn spindles according to a packaging requirement; and adjust the packaging task and the device control parameter of each stand-alone device 20 in combination with work data returned by each stand-alone device 20.

Each stand-alone device 20 is configured to receive the corresponding packaging task and device control parameter sent by the control device 10; execute the corresponding packaging task based on the corresponding device control parameter; and return the work data corresponding to the corresponding packaging task to the control device 10.

Here, packaging of different target types of yarn spindles can share the control device 10 and at least some of the plurality of stand-alone devices 20.

Figure 2:
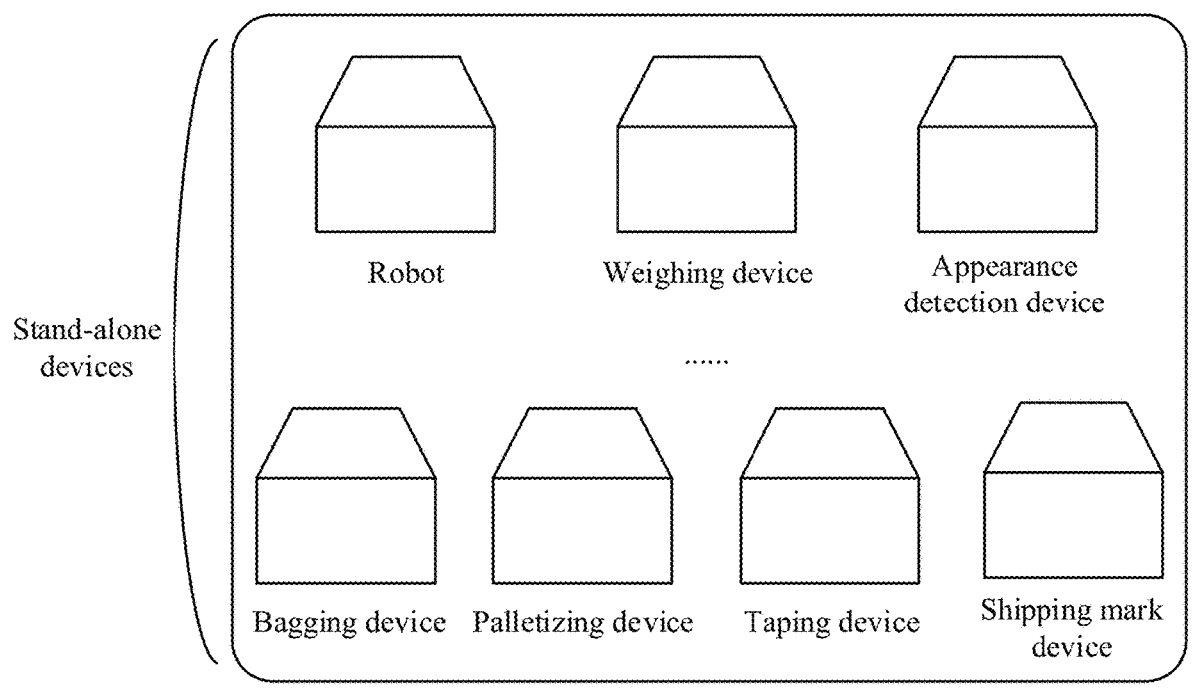
FIG. 2 is a schematic diagram of types of stand-alone device according to an embodiment of the present disclosure.

As shown in FIG. 2, the plurality of stand-alone devices may include: a robot, a weighing device, an appearance detection device, a bagging device, a palletizing device, a taping device, a shipping mark device, and other devices.

In an embodiment of the present disclosure, the robot is used to remove a yarn spindle from a trolley and insert the yarn spindle onto a tray, and the robot may be a robot arm or a device with a robot arm.

In an embodiment of the present disclosure, the weighing device is used to weigh the weight of the yarn spindle.

In an embodiment of the present disclosure, the appearance detection device is used to perform appearance detection on the yarn spindle, the appearance detection device may be a detection device composed of a camera, and the appearance detection device can determine whether the yarn spindle is damaged based on an image of the yarn spindle captured by the camera and give an appearance detection result.

In an embodiment of the present disclosure, the bagging device is used to cover a packaging bag on the surface of the yarn spindle.

In an embodiment of the present disclosure, the palletizing device is used to remove the bagged yarn spindles from the tray and palletize them into stack.

In an embodiment of the present disclosure, the taping device is used to tape the stacked yarn spindles.

In an embodiment of the present disclosure, the shipping mark device is used to affix a shipping mark on one side of the entire stack of yarn spindles that have been palletized, and the shipping mark includes production information, production process, quality inspection result and other information of the yarn spindles in this box.

In an embodiment of the present disclosure, the control device can be a device with automated control logic, the control device can be deployed on an electronic device for controlling the yarn spindle packaging line, and the electronic device can be a server or computer located in an on-site central control room and is used to control the work of each stand-alone device deployed in the packaging site. Here, the present disclosure does not limit the type of the electronic device in which the control device is located.

In an embodiment of the present disclosure, one yarn spindle packaging line includes a plurality of stand-alone devices, the plurality of stand-alone devices in one yarn spindle packaging line are not the same type of devices, and there is at least one of each type of stand-alone device in one pipeline. Specifically, the plurality of stand-alone devices may include a robot, a weighing device, an appearance detection device, a bagging device, a palletizing device, a taping device and a shipping mark device.

In an embodiment of the present disclosure, the yarn spindle packaging line can be understood as a part of the yarn spindle packaging system, the yarn spindle packaging line can include a plurality of stand-alone devices used to perform different packaging operations on the wound yarn spindles, and the plurality of stand-alone devices can be connected through a transmission device. Here, the stand-alone device can be understood as a device at any work station on the yarn spindle packaging line. The transmission device can be understood as a device used to transport the tray on the yarn spindle packaging line. The width of the transmission device can be selected and adjusted as needed.

In some embodiments, the packaging requirement includes at least the number of packaged yarn spindles, and may also include the speed of packaging the yarn spindles. The packaging requirement can be generated based on information such as the yield of yarn spindles, the planned storage time and planned delivery time, whether it is urgent, and the grade requirement of yarn spindles. The packaging requirement can be a packaging requirement manually input by the staff, or a packaging requirement automatically generated by the packaging requirement generation model based on the input information such as the yield of yarn spindles, the planned storage time and the planned delivery time.

In some embodiments, the packaging tasks of the stand-alone devices are different. For example, the weighing device is responsible for weighing the weight of the yarn spindle; the appearance detection device is responsible for detecting the appearance of the yarn spindle; and the bagging device is responsible for putting a packaging bag on the surface of the yarn spindle. The packaging task of the stand-alone device can include the number of target yarn spindles that need to be packaged, the time when the packaging of the first batch of yarn spindles or the first yarn spindle starts, and the time when the packaging of the last batch of yarn spindles or the last yarn spindle ends. Here, the packaging task may also include the work start time and work end time, and the work start time and work end time may refer to the work start time and work end time of each stand-alone device.

In some embodiments, the device control parameter may include a device control parameter formulated for the packaging task of the stand-alone device. For example, the device control parameter may include interval time, distance, etc.

In some embodiments, the working data is data that can be used to represent the working state of the stand-alone device. Specifically, the work data may include: data for representing "in operation" or "in preparation for operation" or "in suspension of operation" or "operation failure", and the number of yarn spindles that have been packaged, the number of yarn spindles that have not been packaged, etc. Here, the control device can adjust the packaging task and device control parameter of the first stand-alone device based on the work data returned by the first stand-alone device; and the control device can also adjust the packaging tasks and device control parameters of the first stand-alone device and at least one second stand-alone device based on the work data returned by the first stand-alone device. Here, the first stand-alone device is any stand-alone device among the plurality of stand-alone devices, and the second stand-alone device is any other stand-alone device among the plurality of stand-alone devices except the first stand-alone device.

In some embodiments, the control device 10 is further configured to: output the alarm information on the premise that a stand-alone device 20 is judged to be faulty based on the work data returned by the stand-alone device 20. This alarm information is used to remind a manager or maintenance personnel that the stand-alone device is faulty so that the stand-alone device can be repaired as soon as possible. Here, the alarm information can be output through a terminal that communicates with the control device, such as a mobile phone, laptop computer, personal computer, etc.

Here, the types of target yarn spindles include but are not limited to: Draw Textured Yarn (DTY), Pre-Oriented Yarn (POY), and Full Draw Yarn (FDY).

In some embodiments, the control device 10 is specifically configured to: obtain the data of target yarn spindles to be packaged, where the data may include quantity, batch number, estimated completion time, whether to rush, quality requirement and other data; obtain the packaging requirement of the target yarn spindles based on the data; determine a plurality of stand-alone devices for packaging the target yarn spindles and the packaging tasks respectively corresponding to the plurality of stand-alone devices based on the packaging requirement; and send the corresponding packaging tasks to the stand-alone devices. Here, the target yarn spindles are usually the same type of yarn spindles, and the same type of yarn spindles have the same product parameters, such as size, shape, etc. Here, the target yarn spindles may also be different types of yarn spindles, and different types of yarn spindles may have different product parameters, such as weight, linear density, color absorption, curling shrinkage, etc.

In some embodiments, the control device 10 is further specifically configured to: obtain the data of target yarn spindles to be packaged, where the data may include quantity, batch number, estimated completion time, whether to rush, quality requirement and other data; obtain the packaging requirement of the target yarn spindles based on the data; determine a plurality of stand-alone devices for packaging the target yarn spindles based on the packaging requirement; and send the packaging requirement to the plurality of stand-alone devices, so that the plurality of stand-alone devices generate respective corresponding packaging tasks based on the packaging requirement. Here, the target yarn spindles are usually the same type of yarn spindles, and the same type of yarn spindles have the same product parameters, such as size, shape, etc. Here, the target yarn spindles may also be different types of yarn spindles, and different types of yarn spindles may have different product parameters, such as weight, linear density, color absorption, curling shrinkage, etc.

In some embodiments, the robot removes the target yarn spindle from the trolley through a mechanical arm and inserts the target yarn spindle onto a yarn reel. The robot may be a device with a mechanical arm. Specifically, the grasping strength, grasping angle, grasping quantity and grasping distance of the robot can be adjusted according to the packaging requirement of the target yarn spindle.

In some embodiments, the weighing device may have a built-in weighing instrument to grab the yarn spindle on the tray and obtain the weight data of the yarn spindle; and upload the weight data of the yarn spindle to the control device.

In some embodiments, the appearance detection device may be composed of a plurality of cameras. The cameras may be divided into a close-range camera and a long-range camera. Specifically, the short-range camera is used to detect the details of the target yarn spindle, such as whether there is slight damage, whether there is oil stain, etc.; and the long-range camera is used to detect the overall target yarn spindle, such as the shape of the target yarn spindle.

In some embodiments, the bagging device is used to cover a packaging bag on the surface of the target yarn spindle. Here, the parameters such as frequency of the bagging device may be adjusted based on the packaging requirement of the target yarn spindle.

In some embodiments, the taping device is used to tape the stacked yarn spindles. Here, the number of yarn spindles in a single packaging box may be adjusted according to the size of the target yarn spindle.

In some embodiments, the shipping mark device is used to affix a shipping mark on one side of the entire stack of yarn spindles that have been palletized. Here, the position of the shipping mark may be adjusted according to the packaging requirement of the target yarn spindle.

In some embodiments, the plurality of stand-alone devices may also include an elevator and/or a shuttle. Specifically, the elevator is used to transport the empty trolley to the floor where the yarn spindle packaging line is located according to a third control instruction sent by the control device. Here, the third control instruction may be determined based on the position information of the target yarn spindle, and the third control instruction is used to instruct the elevator to operate. Exemplarily, if the yarn spindle packaging line is on the first floor and the empty trolley is on the second floor, the elevator can transport the empty trolley from the second floor to the first floor. Exemplarily, if the yarn spindle packaging line is on the second floor and the empty trolley is on the first floor, the elevator can transport the empty trolley from the first floor to the second floor. The shuttle is used to transport a tray matching the target type of yarn spindles to the loading work station according to a fourth control instruction sent by the control device, and the loading work station is the first work station for packaging yarn spindles. Here, the fourth control instruction may be used to instruct the shuttle to operate.

In an embodiment of the present disclosure, the control device 10 is further configured to: when different target types of yarn spindles are not packaged simultaneously, obtain yarn spindle size information corresponding to a target yarn spindle to be packaged; and adjust a size of a tray according to the yarn spindle size information; where the tray is configured to insert and receive yarn spindles.

In some embodiments, the target yarn spindle refers to a yarn spindle that is about to enter the yarn spindle packaging line.

Here, the size of the tray includes the current radial parameter (i.e., width parameter) and/or height parameter of the tray.

In the embodiment of the present disclosure, the tray includes a tray body, an adjustment component and a controller on the yarn spindle packaging line. The first end of the tray body is used to cooperate with the transmission device of the yarn spindle packaging line, and the second end of the tray body is used to insert and receive a yarn spindle reel on which the yarn spindle is wound. The adjustment component is located on the tray body. The controller is located on the tray body, and the controller is connected to the adjustment component.

In some embodiments, the tray body includes a bullet structure for placing a single yarn spindle. Specifically, a tray may include a plurality of bullet structures, and each bullet structure may place a yarn spindle. Here, since the sizes of the target yarn spindles are different, the distance of the bullet structures in the tray may be adjusted.

In an embodiment of the present disclosure, if the stand-alone device has a size limitation requirement for the tray body, the size of the tray body needs to be adjusted when the tray body enters the stand-alone device, to meet the requirement of the target device to perform the packaging operation on the yarn spindle reel on which the yarn spindle is wound.

In an embodiment of the present disclosure, different target types of yarn spindles are not packaged simultaneously, which can be understood as: only one target type of yarn spindles are processed at the same time on the yarn spindle packaging line. For example, the DTY yarn spindles are packaged at the first time, the POY yarn spindles are packaged at the second time, and the FDY yarn spindles are packaged at the third time.

In this way, when different target types of yarn spindles are not packaged simultaneously, the size of the tray can be automatically adjusted, to better adapt to the packaging of the target type of yarn spindles, avoid packaging damage, packaging failure and other cases caused by the mismatch of the size of the tray and the size of the target types of yarn spindles during the packaging process, and facilitate improving the packaging quality and efficiency of yarn spindles.

In an embodiment of the present disclosure, the control device 10 is further configured to: when different target types of yarn spindles are packaged simultaneously, schedule a trolley and a tray matching with each target type of yarn spindles for packaging each target type of yarn spindles according to a packaging process of each target type of yarn spindles, where the trolley is configured to transport yarn spindles to be packaged.

In some embodiments, the trolley is used to transport or transfer the target yarn spindles to the target stand-alone device.

In some embodiments, for the entire packaging process of each type of yarn spindles, the yarn spindles need to pass through a plurality of stand-alone devices in sequence on the yarn spindle packaging line, that is, each target type of yarn spindles need to pass through a plurality of packaging stages, and each stand-alone device corresponds to one packaging stage. For example, a plurality of stand-alone devices that POY yarn spindles need to pass through include at least: a robot, a weighing device, an appearance detection device, a bagging device, a palletizing device, a taping device and a shipping mark device. Here, when passing through the robot, it belongs to the stage of inserting and receiving yarn spindles on the empty tray; when passing through the weighing device, it belongs to the weighing stage; when passing through the appearance detection device, it belongs to the appearance detection stage; when passing through the bagging device, it belongs to the bagging stage; when passing through the palletizing device, it belongs to the palletizing stage; when passing through the taping device, it belongs to the taping stage; when passing through the shipping mark device, it belongs to the stage of printing and pasting the shipping mark. This packaging process can be understood as: the position of the stand-alone device where the POY yarn spindle is currently located (that is, the current stage). Exemplarily, the target yarn spindle passes through the appearance detection device, that is, the packaging process of the target yarn spindle is in the appearance detection stage. Here, the packaging process of the target yarn spindle can be uploaded to the control device in real time, so that the control device can monitor the packaging process of the target yarn spindle in real time; and the control device can also adjust the packaging task of the target yarn spindle based on the packaging process of the target yarn spindle.

For example, a packaging factory area includes four major areas, respectively recorded as a first area, a second area, a third area and a fourth area; where a plurality of first-type stand-alone devices for packaging POY yarn spindles are placed in the first area; a plurality of second-type stand-alone devices for packaging DTY yarn spindles are placed in the second area; a plurality of third-type stand-alone devices for packaging FDY yarn spindles are placed in the third area; and empty trolleys and empty trays are placed in the fourth area. The empty trolleys and trays in the fourth area may supply trolleys and trays for packaging of the yarn spindles in the first area, the second area and the third area. Exemplarily, after detecting that the first robot on the first area grabs several yarn spindles on the first trolley, or when there are still a target number of yarn spindles that have not been grabbed on the first trolley, a new first trolley is allocated for the first area, so that the new first trolley transports new yarn spindles to be packaged to the first area, where there may be one or more first trolleys; and the first trolleys are used to load the POY yarn spindles. Similarly, after detecting that the second robot on the second area grabs several yarn spindles on the second trolley, or when there are still a target number of yarn spindles that have not been grabbed on the second trolley, a new second trolley is allocated for the second area, so that the new second trolley transports new yarn spindles to be packaged to the second area, where there may be one or more second trolleys; and the second trolleys are used to load the DTY yarn spindles. Similarly, after detecting that the third robot on the third area grabs several yarn spindles on the third trolley, or when there are still a target number of yarn spindles that have not been grabbed on the third trolley, a new third trolley is allocated for the third area, so that the new third trolley transports new yarn spindles to be packaged to the third area, where there may be one or more third trolleys; and the third trolleys are used to load the FDY yarn spindles. Exemplarily, when detecting that the number of first trays on the first area does not meet the demand for the number of yarn spindles, or when the first trays on the first area are damaged, a new first tray is allocated for the first area, so that the new first tray can insert and receive the yarn spindles to be packaged, where there may be one or more first trays; and the first tray is used for the robot to insert and receive the POY yarn spindles on the body of the first tray. Similarly, when detecting that the number of second trays on the second area does not meet the demand for the number of yarn spindles, or when the second trays on the second area are damaged, a new second tray is allocated for the second area, so that the new second tray can insert and receive the yarn spindles to be packaged, where there may be one or more second trays; and the second tray is used for the robot to insert and receive the DTY yarn spindles on the body of the second tray. Similarly, when detecting that the number of third trays on the third area does not meet the demand for the number of yarn spindles, or when the third trays on the third area are damaged, a new third tray is allocated for the third area, so that the new third tray can insert and receive the yarn spindles to be packaged, where there may be one or more third trays; and the third tray is used for the robot to insert and receive the FDY yarn spindles on the body of the third tray.

For another example, a packaging factory area includes two major areas, recorded as a fifth area and a sixth area; where a plurality of stand-alone devices for packaging yarn spindles are placed in the fifth area; and empty trolleys and empty trays are placed in the sixth area. The empty trolleys and trays in the sixth area may supply trolleys and trays for packaging of various types of yarn spindles. Exemplarily, the stand-alone device located in the fifth area can package POY yarn spindles and FDY yarn spindles simultaneously; and the robot grabs the first number of POY yarn spindles and the second number of FDY yarn spindles simultaneously, and then inserts and receives the POY yarn spindles on the fifth tray suitable for the POY yarn spindles, and inserts and receives the FDY yarn spindles on the sixth tray suitable for the FDY yarn spindles. When detecting that the number of fifth or sixth trays on the fifth area does not meet the demand for the number of trays, or when the fifth or sixth trays are damaged, a new fifth or sixth tray is allocated for the fifth area, so that the new fifth or sixth tray can insert and receive the yarn spindles to be packaged. Here, there may be one or more fifth trays; and the fifth tray is used for the robot to insert and receive the POY yarn spindles on the body of the fifth tray. There may be one or more sixth trays; and the sixth tray is used for the robot to insert and receive the FDY yarn spindles on the body of the sixth tray. Exemplarily, the stand-alone device located in the fifth area can package POY yarn spindles and FDY yarn spindles simultaneously; and the robot grabs the first number of POY yarn spindles and the second number of FDY yarn spindles simultaneously, and then inserts and receives the POY yarn spindles on the tray suitable for the POY yarn spindles, and inserts and receives the FDY yarn spindles on the tray suitable for the FDY yarn spindles. When detecting that the number of fifth trays on the fifth area does not meet the demand for the number of yarn spindles, or when the fifth or sixth trays are damaged, a new fifth or sixth tray is allocated for the fifth area, so that the new fifth or sixth tray can insert and receive the yarn spindles to be packaged. Here, there may be one or more fifth trays; and the fifth tray is used for the robot to insert and receive the POY yarn spindles on the body of the fifth tray. There may be one or more sixth trays; and the sixth tray is used for the robot to insert and receive the FDY yarn spindles on the body of the sixth tray. Exemplarily, after detecting that the fifth robot on the fifth area grabs several POY yarn spindles on the fifth trolley, or when there are still a target number of yarn spindles that have not been grabbed on the fifth trolley, a new fifth trolley is allocated for the fifth area, so that the new fifth trolley transports new POY yarn spindles to be packaged to the fifth area, where there may be one or more fifth trolleys; and the fifth trolleys are used to load the POY yarn spindles. After detecting that the fifth robot on the fifth area grabs several FDY yarn spindles on the sixth trolley, or when there are still a target number of yarn spindles that have not been grabbed on the sixth trolley, a new sixth trolley is allocated for the fifth area, so that the new sixth trolley transports new FDY yarn spindles to be packaged to the fifth area, where there may be one or more sixth trolleys; and the sixth trolleys are used to load the FDY yarn spindles. Here, the distance between the fifth trolley and the sixth trolley is a preset distance, so that the fifth robot can grab the POY yarn spindles on the fifth trolley and the FDY yarn spindles on the sixth trolley simultaneously. In this way, when different target types of yarn spindles are packaged simultaneously, the trolley and tray matching with each target type of yarn spindles can be allocated and scheduled for each target type of yarn spindles according to the packaging process of each target type of yarn spindles, to realize the requirement of packaging different types of yarn spindles simultaneously, facilitate improving the intelligence of yarn spindle packaging, and also facilitate improving the packaging quality and efficiency of yarn spindles.

In an embodiment of the present disclosure, each stand-alone device 20 is further configured to: when receiving a corresponding latest packaging task, detect whether a current packaging task is completed; continue executing the current packaging task if the current packaging task is not completed; and execute the corresponding latest packaging task based on a corresponding latest device control parameter after completing the current packaging task.

Exemplarily, the packaging task of the weighing device is to weigh the yarn spindle with batch number 001; and the new packaging task received in the weighing process is to weigh the yarn spindle with batch number 002. If the weighing device has completed the weighing of the yarn spindle with batch number 001, the weighing device will weigh the yarn spindle with batch number 002; if the weighing device has started but has not yet completed the weighing of the yarn spindle with batch number 001, the weighing device weighs the yarn spindle with batch number 001 at first, and then weighs the yarn spindle with batch number 002 after completing the weighing of the yarn spindle with batch number 001.

In this way, if the current packaging task is not completed, the current packaging task that is not completed continues to be executed; after the current packaging task is completed, the corresponding latest packaging task is executed based on the corresponding latest device control parameter. This can not only ensure that the original packaging task is performed smoothly, but also avoid the problem of packaging confusion caused by executing the new packaging task when the original packaging task is not completed.

In an embodiment of the present disclosure, each stand-alone device 20 is further configured to: when receiving a corresponding latest device control parameter, compare a current device control parameter with the latest device control parameter, determine a device control parameter that needs to be adjusted based on a comparison result, and adjust the device control parameter that needs to be adjusted to meet a requirement of the latest device control parameter.

Here, the device control parameter may include a target device control parameter of the stand-alone device, or a device control parameter adjustment amount relative to the current device control parameter.

In some embodiments, each stand-alone device can periodically upload the current device control parameter to the control device, so that the control device can generate the latest device control parameter, such as target device control parameter.

In some embodiments, each stand-alone device can upload the current device control parameter to the control device when receiving a reporting instruction, so that the control device can generate the latest device control parameter, such as device control parameter adjustment amount relative to the current device control parameter.

In some embodiments, if each stand-alone device receives the latest device control parameter, such as the target device control parameter, the stand-alone device can determine the device control parameter adjustment amount relative to the current device control parameter based on the current device control parameter, and then make an adjustment based on the device control parameter adjustment amount.

In some embodiments, if each stand-alone device receives the latest device control parameter, such as the device control parameter adjustment amount relative to the current device control parameter, the stand-alone device can make an adjustment based on the device control parameter adjustment amount.

In some embodiments, the appearance detection device receives the latest device control parameters, which are "the height of the close-range camera from the yarn spindle tray is 5 cm, the distance between the close-range camera and the long-distance camera is 10 cm, and the height of the long-range camera from the yarn spindle tray is 15 cm". The appearance detection device obtains the current device control parameters, which are "the height of the close-range camera from the yarn spindle tray is 3 cm, the distance between the close-range camera and the long-distance camera is 13 cm, and the height of the long-range camera from the yarn spindle tray is 15 cm"; the latest device control parameters are compared with the current device control parameters, to obtain the device control parameters that need to be adjusted as: "the adjustment amount of the height of the close-range camera from the yarn spindle tray is 2 cm, and the adjustment amount of the distance between the close-range camera and the long-distance camera is 3 cm"; and the appearance detection device is adjusted according to the device control parameters that need to be adjusted.

In this way, the current device control parameters are compared with the latest device control parameters, the device control parameters that need to be adjusted are determined based on the comparison result, and the device control parameters that need to be adjusted are adjusted, so that the stand-alone device can quickly and accurately reach the requirement of the latest device control parameters, to thereby facilitate improving the packaging efficiency of yarn spindles.

Figure 3:
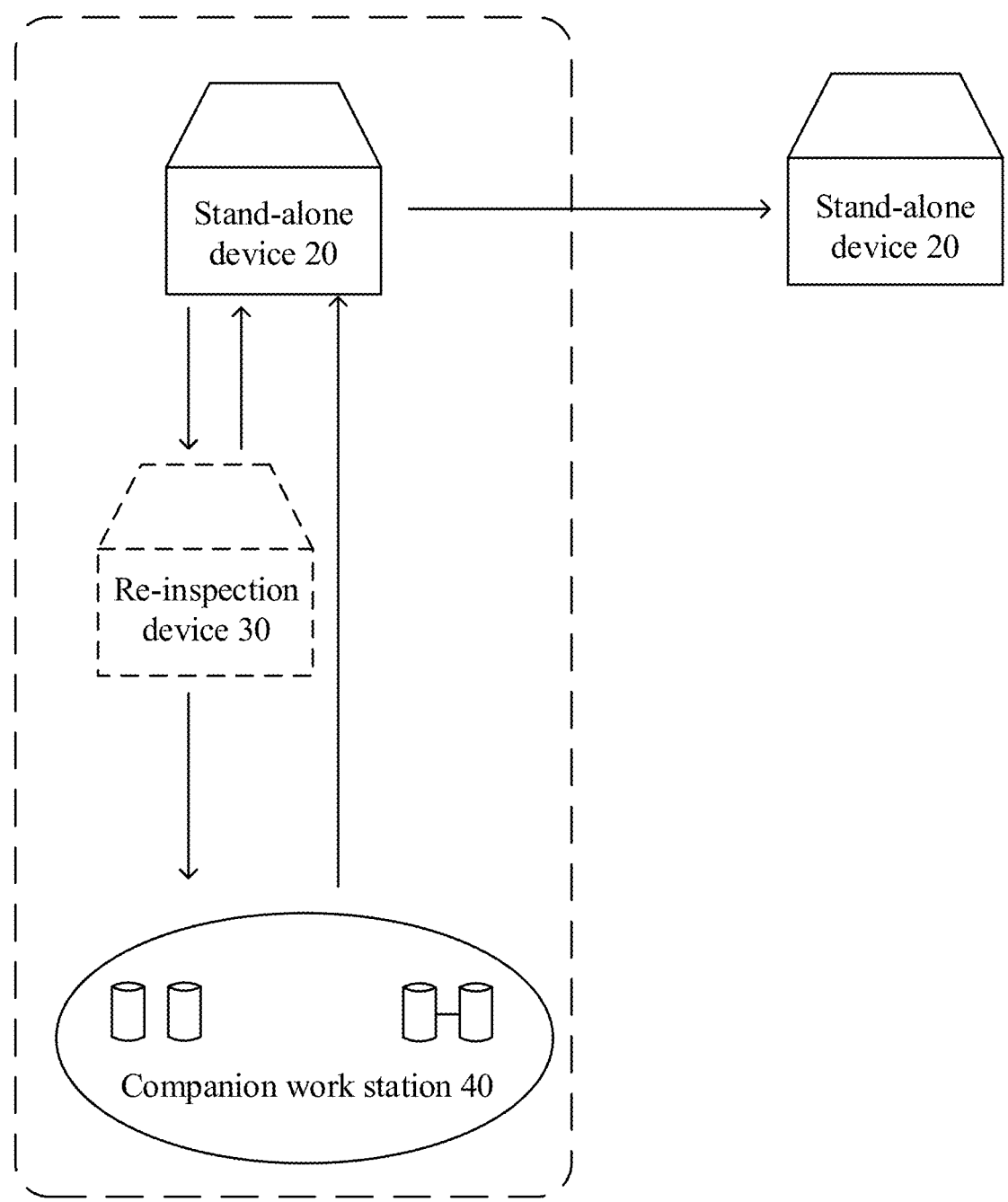
FIG. 3 is a schematic diagram of the relationship among the stand-alone device, its re-inspection device and companion work station according to an embodiment of the present disclosure.

In an embodiment of the present disclosure, as shown in FIG. 3, the yarn spindle packaging system further includes: a re-inspection device 30 connected to each stand-alone device, configured to inspect received yarn spindles; and a companion work station 40 connected to each re-inspection device, configured to store yarn spindles obtained from the connected re-inspection device according to an inspection result; where each stand-alone device 20 is further configured to detect whether currently processed yarn spindles belong to a same batch, and transport all the currently processed yarn spindles to the corresponding re-inspection device or transport yarn spindles not in a target batch to the corresponding re-inspection device if the currently processed yarn spindles do not belong to the same batch.

In some embodiments, the re-inspection device 30 can be deployed on the side of each stand-alone device. For example, the next stand-alone device of the stand-alone device A is stand-alone device B; the stand-alone device A is connected to the re-inspection device a, the stand-alone device B is connected to the re-inspection device b, and the re-inspection device a has no connection with the re-inspection device b. In practical applications, in order to save cost, the re-inspection devices can only be configured for the important stand-alone devices. For example, the corresponding re-inspection devices are configured for the weighing device and appearance detection device.

In some embodiments, the re-inspection device is used to inspect the received or sent yarn spindles. The re-inspection device usually uses a combination of hardware and software; the software part can deploy an image processing module, an image recognition module, etc. according to the re-inspection requirement; and the hardware part can install one or more cameras according to the re-inspection requirement, and can also install one or more different kinds of sensors.

In some embodiments, the yarn spindle with abnormal detection result is re-inspected by the re-inspection device. When the re-inspection device detects that the yarn spindle is damaged or broken, the yarn spindle is transported to the scrapped product warehouse. Here, the unqualified yarn spindles can be transported to other stand-alone device or the scrapped product warehouse after the preset time, and the transportation of the unqualified yarn spindles can improve the packaging efficiency of yarn spindles without affecting subsequent processes; or, when the unqualified yarn spindles are detected, the unqualified yarn spindles can be transported directly to other stand-alone device or the scrapped product warehouse, so that the unqualified yarn spindles can be transported to other locations in a timely manner.

In some embodiments, when receiving a yarn spindle not in the target batch, the re-inspection device performs batch inspection on the received yarn spindle. If this yarn spindle does not belong to the target batch, the quality detection is performed on the yarn spindle. If the detection is qualified, the yarn spindle will be stored in the companion work station connected to the re-inspection device for the control device to call.

In this way, the re-inspection through the re-inspection device can not only improve the accuracy of packaging yarn spindles, but also effectively utilize the yarn spindles with qualified quality not in the target batch.

In an embodiment of the present disclosure, the control device is further configured to: when receiving an alarm message sent by a stand-alone device, determine a position of a companion work station where yarn spindles in the target batch are stored, and schedule yarn spindles that meet quality and batch requirements for the stand-alone device that sends the alarm message from the position of the companion work station; where the alarm message is used to indicate that the currently processed yarn spindles do not belong to the same batch.

In some embodiments, when the stand-alone device detects that the current yarn spindle does not belong to the same batch as the processed yarn spindles or the current yarn spindle does not belong to the target yarn spindles, the stand-alone device sends an alarm message to the control device. Here, the alarm message at least includes the position information of the stand-alone device, and the alarm message may also include the model of the stand-alone device, the information of the yarn spindles that do not meet the requirements, etc.

In some embodiments, the stand-alone device detects whether the currently processed yarn spindles belong to the same batch; if not, the yarn spindles not in the target batch are transported to the companion work station of the stand-alone device.

In this way, sending the alarm information to the control device in time, helps the control device to plan and control the entire yarn spindle packaging line, and thus helps to increase the packaging speed of yarn spindles.

In an embodiment of the present disclosure, the control device 10 is further configured to: obtain the historical work data of each stand-alone device in a first time period; and input the packaging requirement and the historical work data of each stand-alone device into a packaging task generation model, and obtain the packaging task of each stand-alone device in a second time period output by the packaging task generation model; where the packaging task generation model is obtained by using a historical work data sample and a packaging requirement sample of each stand-alone device for training and is used to predict the packaging task of each stand-alone device.

In some embodiments, the historical work data may include: the number of yarn spindles processed by each stand-alone device in the first time period, the time it takes to process the yarn spindles, etc. Here, the historical work data can be automatically generated, and the historical work data is uploaded to the control device upon receiving an acquisition request from the control device. Alternatively, the historical work data is actively uploaded to the control device.

In an embodiment of the present disclosure, the first time period is past time, and the second time period is future time. The method of obtaining historical work data samples and packaging requirement samples is not limited in the embodiments of the present disclosure.

In some embodiments, the training process of the packaging task generation model may include: obtaining training data, which includes packaging requirement samples and historical working data samples of each stand-alone device within a period of time; and training the model to be trained based on the training data, to obtain the packaging task generation model. The packaging task generation model is used to generate the packaging task of each stand-alone device in a period of time.

In this way, the packaging task of each stand-alone device can be automatically generated, providing a basis for the packaging process of each stand-alone device, helping to realize the intelligence of yarn spindle packaging, improve the flexibility of yarn spindle packaging, and thus improve the packaging efficiency of yarn spindles.

In an embodiment of the present disclosure, the plurality of stand-alone devices may include a first-type stand-alone device, a second-type stand-alone device, a third-type stand-alone device and a fourth-type stand-alone device, where the first-type stand-alone device, the second-type stand-alone device, the third-type stand-alone device and the fourth-type stand-alone device are arranged in different areas; the first-type stand-alone device is a stand-alone device suitable for packaging POY yarn spindles, the second-type stand-alone device is a stand-alone device suitable for packaging DTY yarn spindles, the third-type stand-alone device is a stand-alone device suitable for packaging FDY yarn spindles, and the fourth-type stand-alone device is a stand-alone device suitable for packaging DTY yarn spindles, POY yarn spindles and FDY yarn spindles, such as a conveying device, an inbound forklift, an outbound forklift, etc. suitable for packaging DTY yarn spindles, POY yarn spindles and FDY yarn spindles. The control device can simultaneously control multiple types of stand-alone devices in the factory, that is, the control device A can simultaneously control the first-type stand-alone device, the second-type stand-alone device, the third-type stand-alone device, and the fourth-type stand-alone device. One control device can also control a plurality of stand-alone devices in the same type simultaneously, that is, the control device B can simultaneously control the first-type stand-alone devices a1 to ax, the second-type stand-alone devices b1 to by, the third-type stand-alone devices c1 to cz, and the fourth-type stand-alone devices d1 to dk. The three types of stand-alone devices described above are deployed in different areas. For example, the first-type stand-alone devices are deployed in the first area, the second-type stand-alone devices are deployed in the second area, the third-type stand-alone devices are deployed in the third area, and the fourth-type stand-alone devices are deployed in the fourth area. The first, second and third areas are separated, and the fourth-type stand-alone devices are shared by the first, second and third areas, which can not only fully utilize the control capability of the control device and save the packaging cost of different types of yarn spindles; but also effectively avoid the confusion of different types of yarn spindles.

In some embodiments, when different target types of yarn spindles do not share the stand-alone device, a trolley is allocated and scheduled for each target type of yarn spindles according to the packaging process of each target type of yarn spindles. The trolley can be shared, that is, the trolley can transport different types of yarn spindles in the first area, the second area and the third area respectively.

Figure 4:
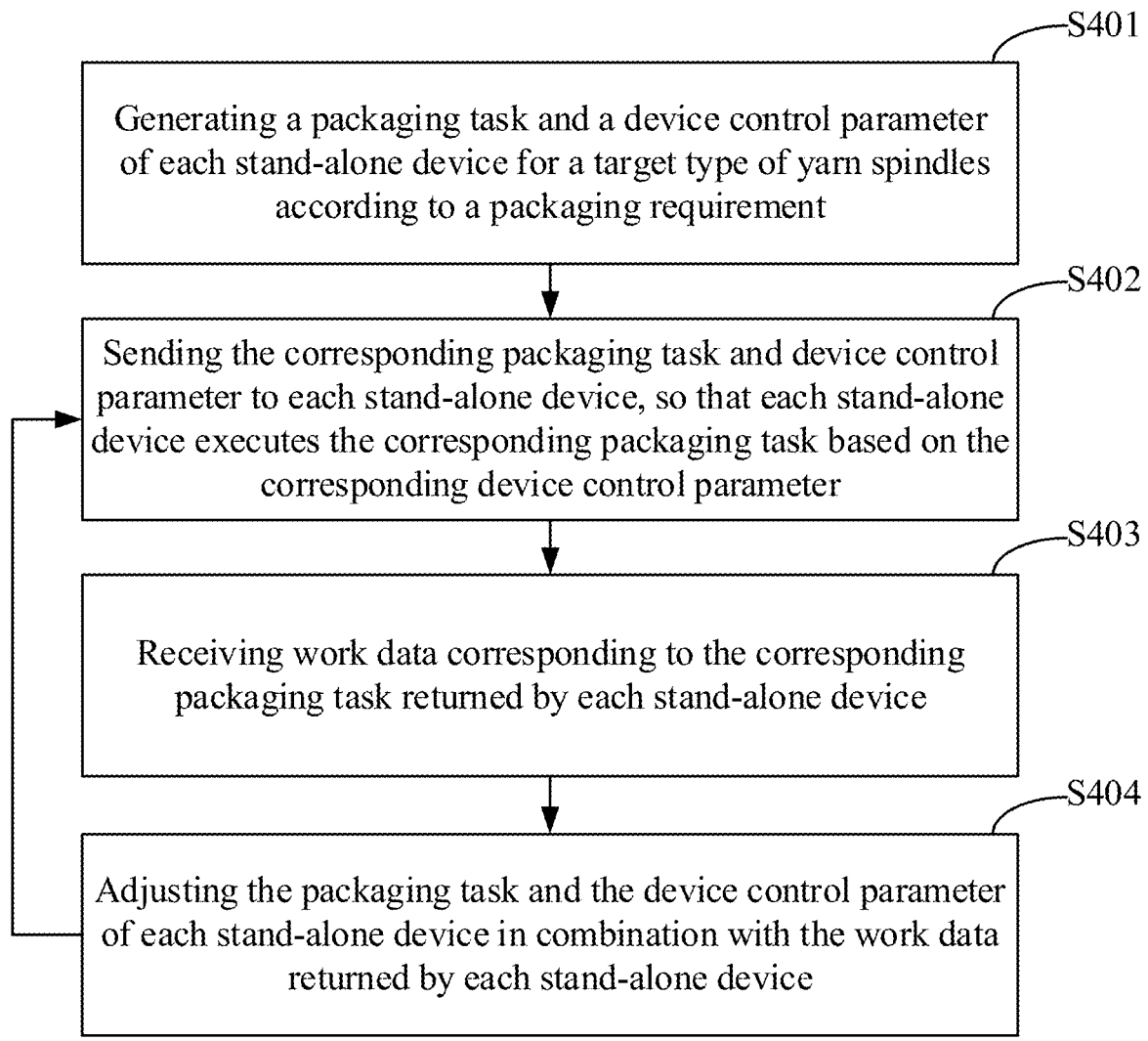
FIG. 4 is a schematic flow chart of a control method for the yarn spindle packaging system according to an embodiment of the present disclosure.

An embodiment of the present disclosure provides a control method for a yarn spindle packaging system. FIG. 4 is a schematic flowchart of the control method for the yarn spindle packaging system according to an embodiment of the present disclosure. The control method for the yarn spindle packaging system can be applied to a control apparatus for the yarn spindle packaging system. The control apparatus for the yarn spindle packaging system is located in an electronic device. This electronic device includes but is not limited to a fixed device and/or a mobile device. For example, the fixed device includes but is not limited to a server, and the server may be a cloud server or an ordinary server. For example, the mobile device includes but is not limited to a mobile phone, a tablet, etc. In some possible implementations, the control method for the yarn spindle packaging system may also be implemented by a processor calling a computer-readable instruction stored in a memory. As shown in FIG. 4, the control method for the yarn spindle packaging system includes:

S401: generating a packaging task and a device control parameter of each stand-alone device for a target type of yarn spindles according to a packaging requirement;

S402: sending the corresponding packaging task and device control parameter to each stand-alone device, so that each stand-alone device executes the corresponding packaging task based on the corresponding device control parameter;

S403: receiving work data corresponding to the corresponding packaging task returned by each stand-alone device; and S404: adjusting the packaging task and the device control parameter of each stand-alone device in combination with the work data returned by each stand-alone device.

After S404 of adjusting the packaging task and the device control parameter of each stand-alone device, S402 is executed to send the corresponding latest packaging task and latest device control parameter to each stand-alone device.

Here, the yarn spindle packaging system is the yarn spindle packaging system described in any of the above embodiments.

In some embodiments, the packaging requirement may be a packaging requirement generated based on the type of yarn spindles. Specifically, since different types of yarn spindles may have different sizes, weights, defective rates, etc., independent packaging requirements need to be generated for each type of yarn spindles.

In some embodiments, the type of the target yarn spindle includes at least one of: DTY, POY and FDY.

In some embodiments, the control device can receive the packaging requirement directly input by the staff on a control panel of the electronic device, or receive the packaging requirement input by the staff through a terminal. The control device can also automatically generate the packaging requirement based on a packaging requirement generation model. For example, the packaging requirement generation model can automatically generate the packaging requirement based on the input information such as the yield of yarn spindles, the planned storage time and the planned delivery time. The packaging requirement may be reflected in the form of text description or packaging parameter. The embodiments of the present disclosure do not limit how to obtain the packaging requirement generation model through training.

Figure 5:
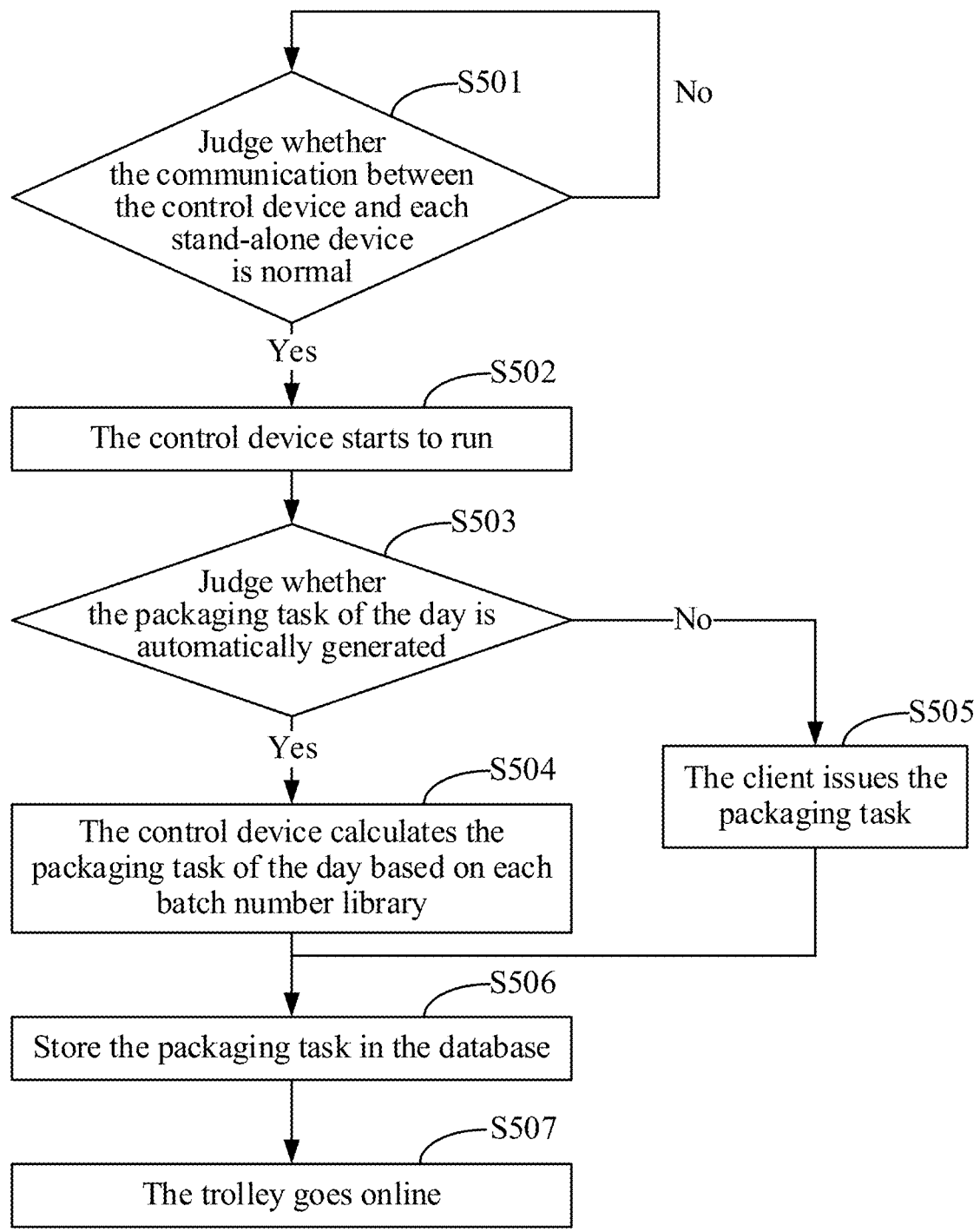
FIG. 5 is a first flow chart of a yarn spindle packaging process according to an embodiment of the present disclosure.

FIG. 5 shows a first flow chart of a yarn spindle packaging process. As shown in FIG. 5, this process may include:

S501: Judge whether the communication between the control device and each stand-alone device is normal; if so, execute S502; if not, execute this step again.

Here, the control device can communicate with the Programmable Logic Controller (PLC) of each stand-alone device. Here, the PLC is a digital operation controller with a microprocessor for automation control, and can load a control instruction into the memory at any time for storage and execution. All stand-alone devices may use one PLC, and different stand-alone devices correspond to different interfaces on the PLC; or, each stand-alone device may correspond to one PLC.

S502: The control device starts to run.

S503: Judge whether the packaging task of the day is automatically generated; if so, execute S504; if not, execute S505.

S504: The control device calculates the packaging task of the day based on each batch number library, and then executes S506, where this step can obtain the packaging task of the day through the packaging task generation model.

S505: The client issues the packaging task, and then enters S506.

S506: Store the packaging task in the database, and then enter S507.

S507: The trolley goes online.

Figure 6:
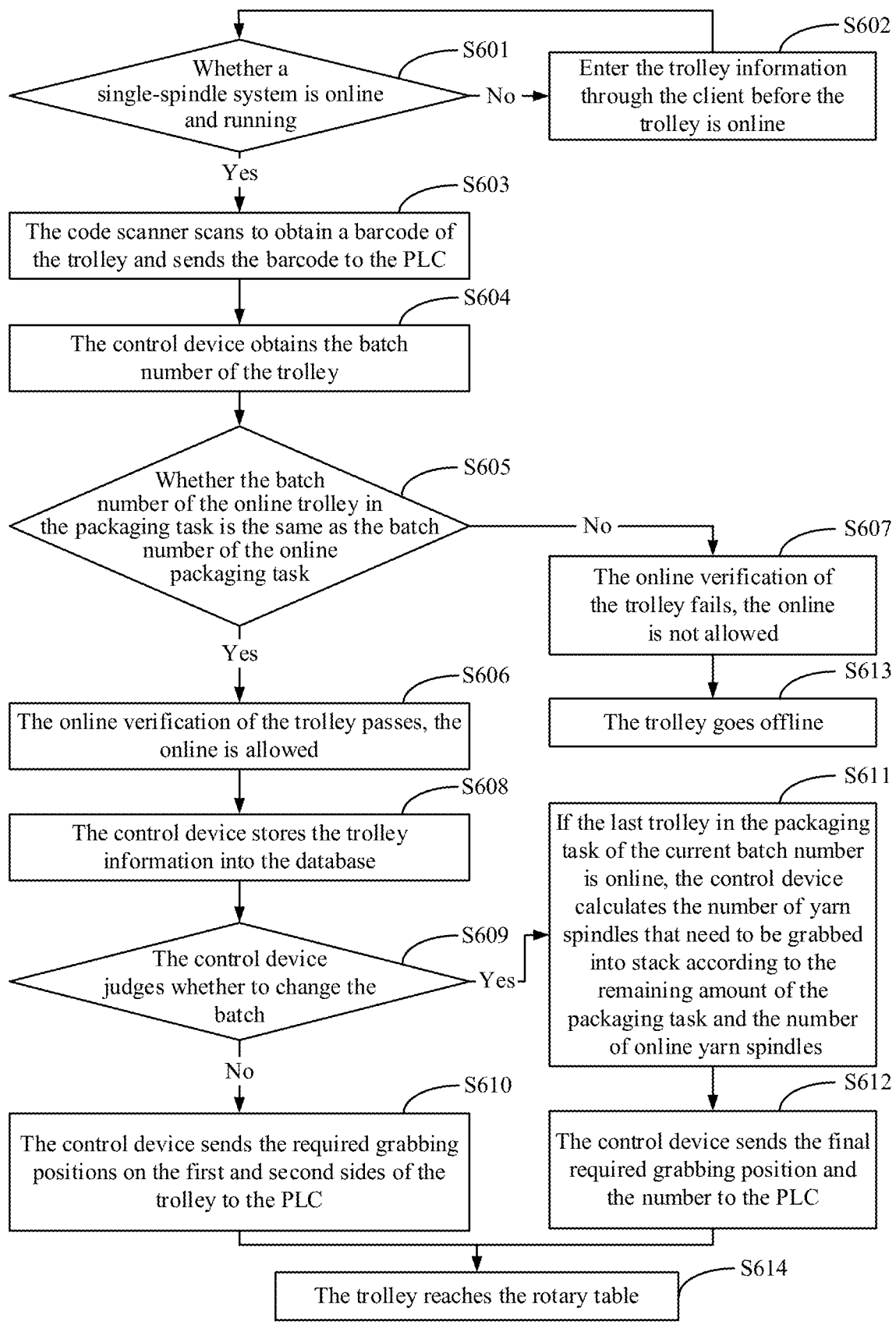
FIG. 6 is a second flow chart of a yarn spindle packaging process according to an embodiment of the present disclosure.

FIG. 6 shows a second flow chart of a yarn spindle packaging process. As shown in FIG. 6, this process may include:

S601: Whether a single-spindle system is online and running; if so, execute S603; if not, execute S602.

S602: Enter the trolley information through the client before the trolley is online.

Here, the trolley information includes the batch number, the order, whether there are yarn spindles at all positions on both sides of the trolley, etc.

S603: The code scanner scans to obtain a barcode of the trolley and sends the barcode to the PLC.

S604: The control device obtains the batch number of the trolley.

Here, the control device obtains the barcode of the trolley, initiates a query request to the single-spindle system based on the barcode of the trolley, and obtains the batch number of the trolley, the information on whether there are yarn spindles at all positions on both sides of the trolley, the detailed information of yarn spindles, etc.

S605: Whether the batch number of the online trolley in the packaging task is the same as the batch number of the online packaging task; if so, execute S606; if not, execute S607.

S606: The online verification of the trolley passes, the online is allowed, and then S608 is executed.

S607: The online verification of the trolley fails, the online is not allowed, and then S613 is executed.

S608: The control device stores the trolley information into the database.

S609: The control device judges whether to change the batch; if so, execute S611; if not, execute S610.

S610: The control device sends the required grabbing positions on the first and second sides of the trolley to the PLC, and then executes S614.

S611: If the last trolley in the packaging task of the current batch number is online, the control device calculates the number of yarn spindles that need to be grabbed into stack according to the remaining amount of the packaging task and the number of online yarn spindles, and then executes S612.

S612: The control device sends the final required grabbing position and the number to the PLC, and then executes S614.

S613: The trolley goes offline.

S614: The trolley reaches the rotary table.

Figure 7:
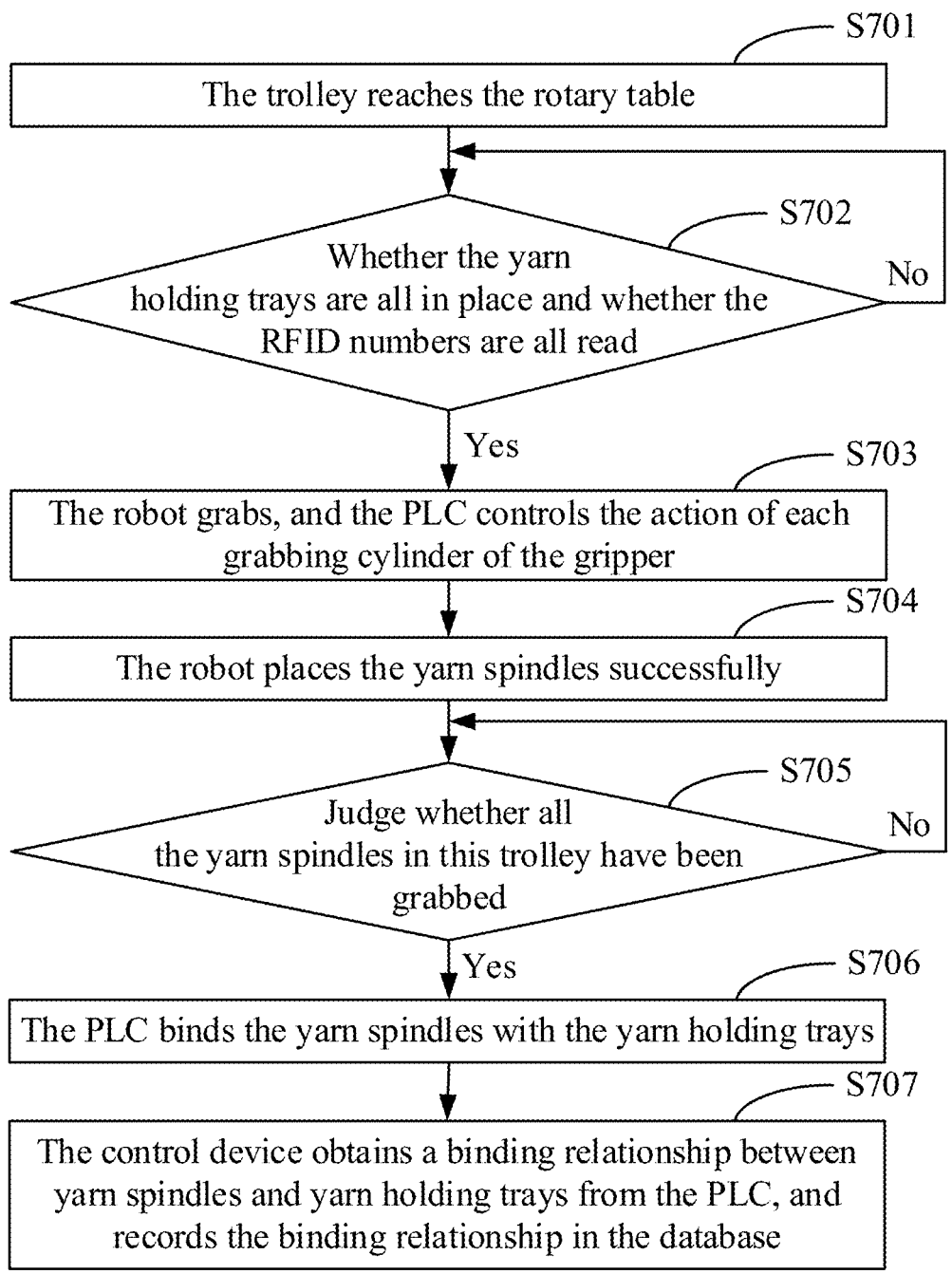
FIG. 7 is a third flow chart of a yarn spindle packaging process according to an embodiment of the present disclosure.

FIG. 7 shows a third flow chart of a yarn spindle packaging process. As shown in FIG. 7, this process may include:

S701: The trolley reaches the rotary table.

S702: Judge whether the yarn holding trays are all in place and whether the Radio Frequency Identification (RFID) numbers are all read; if so, execute S703; if not, continue to execute S702.

Here, the yarn holding trays can also be called small trays.

S703: The robot grabs, and the PLC controls the action of each grabbing cylinder of the gripper.

Here, the PLC controls the action of each grabbing cylinder, including: when facing the position of the trolley with a yarn spindle, the cylinder acts; when facing the position of the trolley without a yarn spindle, the cylinder does not act.

S704: The robot places the yarn spindles successfully.

S705: Judge whether all the yarn spindles in this trolley have been grabbed; if so, execute S706; if not, continue to execute S705.

S706: The PLC binds the yarn spindles with the yarn holding trays.

S707: The control device obtains a binding relationship between yarn spindles and yarn holding trays from the PLC, and records the binding relationship in the database.

Figure 8:
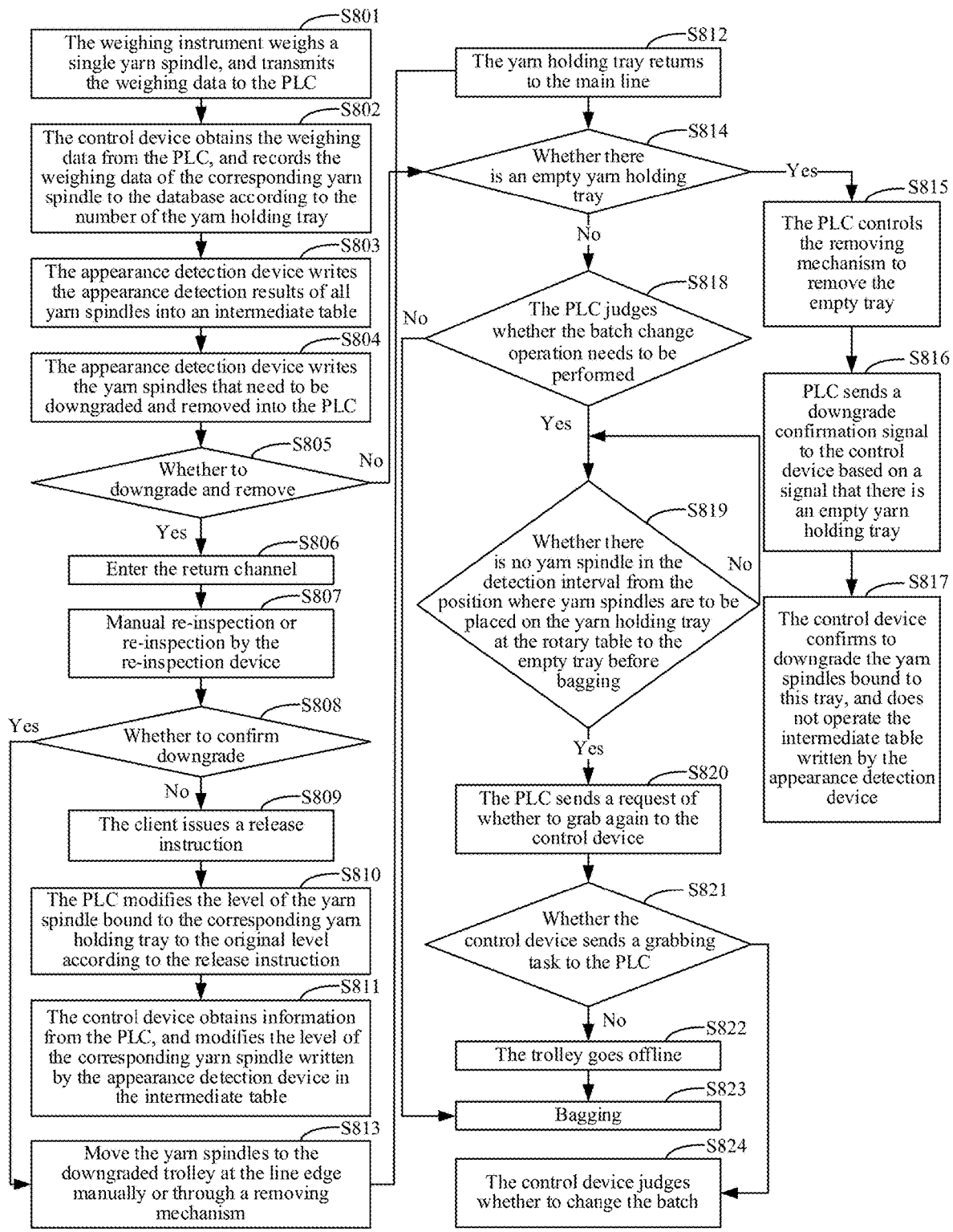
FIG. 8 is a fourth flow chart of a yarn spindle packaging process according to an embodiment of the present disclosure.

FIG. 8 shows a fourth flow chart of a yarn spindle packaging process. As shown in FIG. 8, this process may include:

S801: The weighing instrument weighs a single yarn spindle, and transmits the weighing data to the PLC.

S802: The control device obtains the weighing data from the PLC, and records the weighing data of the corresponding yarn spindle to the database according to the number of the yarn holding tray.

S803: The appearance detection device writes the appearance detection results of all yarn spindles into an intermediate table.

S804: The appearance detection device writes the yarn spindles that need to be downgraded and removed into the PLC; where the downgrading and removing operations mean that the yarn spindles need to be downgraded and removed from the batch of yarn spindles due to defective appearance.

S805: Whether to downgrade and remove; if so, execute S806; if not, execute S814.

S806: Enter the return channel.

S807: Manual re-inspection or re-inspection by the re-inspection device.

S808: Whether to confirm downgrade; if so, execute S813; if not, execute S809.

S809: The client issues a release instruction.

Here, the release instruction is used to indicate that the yarn spindle is released, that is, the yarn spindle is not to be downgraded and removed.

S810: The PLC modifies the level of the yarn spindle bound to the corresponding yarn holding tray to the original level according to the release instruction.

S811: The control device obtains information from the PLC, and modifies the level of the corresponding yarn spindle written by the appearance detection device in the intermediate table.

S812: The yarn holding tray returns to the main line, and then enters S814.

S813: Move the yarn spindles to the downgraded trolley at the line edge manually or through a removing mechanism, and then return to S812.

S814: Whether there is an empty yarn holding tray; if so, execute S815; if not, execute S818.

S815: The PLC controls the removing mechanism to remove the empty tray.

S816: PLC sends a downgrade confirmation signal to the control device based on a signal that there is an empty yarn holding tray.

S817: The control device confirms to downgrade the yarn spindles bound to this tray, and does not operate the intermediate table written by the appearance detection device.

S818: The PLC judges whether the batch change operation needs to be performed; if so, execute S819; if not, execute S823.

S819: Whether there is no yarn spindle in the detection interval from the position where yarn spindles are to be placed on the yarn holding tray at the rotary table to the empty tray before bagging; if so, execute S820; if not, continue to execute S819.

S820: The PLC sends a request of whether to grab again to the control device.

S821: Whether the control device sends a grabbing task to the PLC; if so, execute S824; if not, execute S822.

Here, the grabbing task may include: the grabbing position, the number of grabs, etc.

S822: The trolley goes offline, and then execute S823.

S823: Bagging.

S824: The control device judges whether to change the batch.

Figure 9:
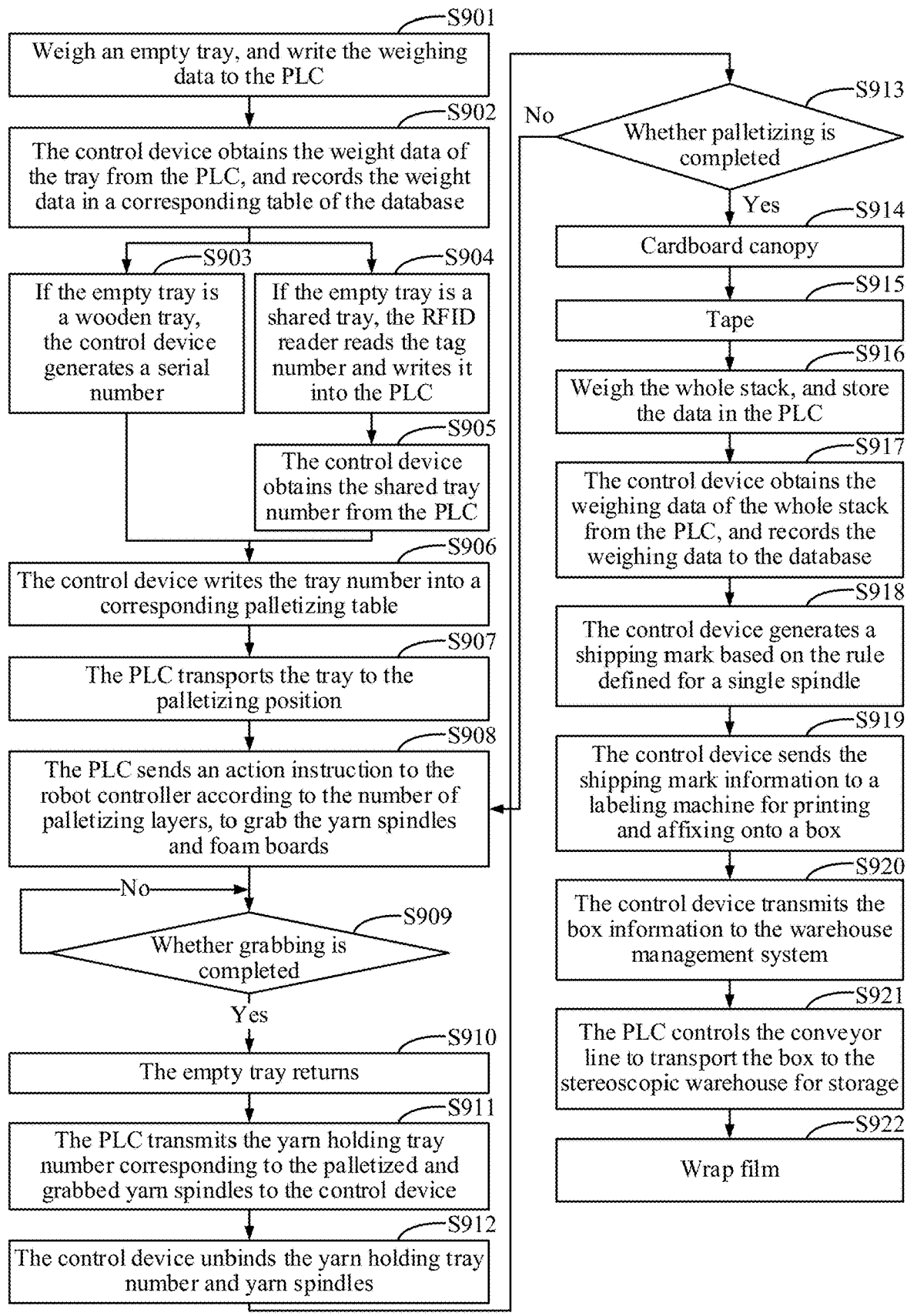
FIG. 9 is a fifth flow chart of a yarn spindle packaging process according to an embodiment of the present disclosure.

FIG. 9 shows a fifth flow chart of a yarn spindle packaging process. As shown in FIG. 9, this process may include:

S901: Weigh an empty tray, and write the weighing data to the PLC.

S902: The control device obtains the weight data of the tray from the PLC, and records the weight data in a corresponding table of the database.

S903: If the empty tray is a wooden tray, the control device generates a serial number.

S904: If the empty tray is a shared tray, the RFID reader reads the tag number and writes it into the PLC.

S905: The control device obtains the shared tray number from the PLC.

S906: The control device writes the tray number into a corresponding palletizing table.

S907: The PLC transports the tray to the palletizing position.

S908: The PLC sends an action instruction to the robot controller according to the number of palletizing layers, to grab the yarn spindles and foam boards.

S909: Whether grabbing is completed; if so, execute S910; if not, continue executing S909.

S910: The empty tray returns.

S911: The PLC transmits the yarn holding tray number corresponding to the palletized and grabbed yarn spindles to the control device.

S912: The control device unbinds the yarn holding tray number and yarn spindles.

S913: Whether palletizing is completed; if so, execute S914; if not, return to S908.

S914: Cardboard canopy.

S915: Tape.

S916: Weigh the whole stack, and store the data in the PLC.

S917: The control device obtains the weighing data of the whole stack from the PLC, and records the weighing data to the database.

S918: The control device generates a shipping mark based on the rule defined for a single spindle.

S919: The control device sends the shipping mark information to a labeling machine for printing and affixing onto a box.

S920: The control device transmits the box information to the Warehouse Management System (WMS).

S921: The PLC controls the conveyor line to transport the box to the stereoscopic warehouse for storage.

S922: Wrap film.

It should be understood that the flow charts shown in FIGS. 5 to 9 are only illustrative and not restrictive. The above processes can be adaptively adjusted or changed according to operational requirements, which will not be described again here. Those skilled in the art can make various obvious changes and/or replacements based on the examples of FIGS. 5 to 9, and the obtained technical solutions still belong to the disclosure scope of the embodiments of the present disclosure.

In an embodiment of the present disclosure, the control method for the yarn spindle packaging system may further include: when different target types of yarn spindles are not packaged simultaneously, obtaining the yarn spindle size information corresponding to a target yarn spindle to be packaged; and adjusting a size of a tray according to the yarn spindle size information.

On the yarn spindle packaging line, the tray includes a tray body, an adjustment component and a controller. The first end of the tray body is used to cooperate with the transmission device of the yarn spindle packaging line, and the second end of the tray body is used to insert and receive a yarn spindle reel on which the yarn spindle is wound. The adjustment component is located on the tray body. The controller is located on the tray body, and the controller is connected to the adjustment component. The controller may have a communicative connection or wired connection with the adjustment component, which can specifically be selected and adjusted as needed. The control device can determine the parameter information that needs to be adjusted by the tray body through the size information of the tray body, the size information of the reel of yarn spindles, the information of the stand-alone device, the information of the transmission device, etc., and then send the parameter information to the controller of the tray body.

In this way, when different target types of yarn spindles are not packaged simultaneously, the size of the tray can be automatically adjusted, to better adapt to the packaging of the target type of yarn spindles, avoid packaging damage, packaging failure and other cases caused by the mismatch of the size of the tray and the size of the target types of yarn spindles during the packaging process, and facilitate improving the packaging quality and efficiency of yarn spindles.

In an embodiment of the present disclosure, the control method for the yarn spindle packaging system may further include: when different target types of yarn spindles are packaged simultaneously, scheduling a trolley and a tray matching with each target type of yarn spindles for packaging each target type of yarn spindles according to a packaging process of each target type of yarn spindles.

The details on how to allocate and schedule a trolley and a tray matching with each target type of yarn spindles for each target type of yarn spindles according to the packaging process of each target type of yarn spindles can refer to the above description and will not be repeated here.

In this way, when different target types of yarn spindles are packaged simultaneously, the trolley and tray matching with each target type of yarn spindles can be allocated and scheduled for each target type of yarn spindles according to the packaging process of each target type of yarn spindles, to realize the requirement of packaging different types of yarn spindles simultaneously, facilitate improving the intelligence of yarn spindle packaging, and also facilitate improving the packaging quality and efficiency of yarn spindles.

In an embodiment of the present disclosure, the control method for the yarn spindle packaging system may further include:

the control device sends a first control instruction to each stand-alone device; and controlling, based on the first control instruction, each stand-alone device to: when receiving the corresponding latest packaging task, detect whether a current packaging task is completed; continue executing the current packaging task if the current packaging task is not completed; and execute the corresponding latest packaging task based on the corresponding latest device control parameter after completing the current packaging task.

The details on how to control each stand-alone device to perform the packaging task can refer to the above description and will not be repeated here.

In this way, if the current packaging task is not completed, the current packaging task continues to be executed; after the current packaging task is completed, the corresponding latest packaging task is executed based on the corresponding latest device control parameter. This can not only ensure that the original packaging task is performed smoothly, but also avoid the problem of packaging confusion caused by executing the new packaging task when the original packaging task is not completed.

In an embodiment of the present disclosure, the control method for the yarn spindle packaging system further includes: the control device sends a second control instruction to each stand-alone device; and controls, based on the second control instruction, each stand-alone device to: when receiving the corresponding latest device control parameter, compare a current device control parameter with the latest device control parameter, determine a device control parameter that needs to be adjusted based on a comparison result, and adjust the device control parameter that needs to be adjusted to meet a requirement of the latest device control parameter.

The details on how to control each stand-alone device to execute the latest device control parameter can refer to the above description and will not be repeated here.

In this way, the current device control parameters are compared with the latest device control parameters, the device control parameters that need to be adjusted are determined based on the comparison result, and the device control parameters that need to be adjusted are adjusted, so that the stand-alone device can quickly and accurately reach the requirement of the latest device control parameters, to thereby facilitate improving the packaging efficiency of yarn spindles.

In an embodiment of the present disclosure, the control method for the yarn spindle packaging system further includes: when receiving an alarm message sent by a stand-alone device, determining a position of a companion work station where yarn spindles in a target batch are stored, and scheduling yarn spindles that meet quality and batch requirements for the stand-alone device that sends the alarm message from the position of the companion work station; where the alarm message is used to indicate that currently processed yarn spindles do not belong to a same batch.

In some embodiments, in response to the event that the stand-alone device A detects that the currently processed yarn spindles are in a batch different from the target type of yarn spindles distributed in the system, an alarm message is sent to the control device; and the control device instructs the stand-alone device A to transport the yarn spindles in the different batch to the re-inspection device connected to the stand-alone device A.

In this way, sending the alarm information to the control device in time, helps the control device to coordinate and control the entire yarn spindle packaging line, and thus helps to increase the packaging speed of yarn spindles.

In an embodiment of the present disclosure, the control method for the yarn spindle packaging system further includes: obtaining the historical work data of each stand-alone device in a first time period; and inputting the packaging requirement and the historical work data of each stand-alone device into a packaging task generation model, and obtaining the packaging task of each stand-alone device in a second time period output by the packaging task generation model; where the packaging task generation model is obtained by using a historical work data sample and a packaging requirement sample of each stand-alone device for training and is used to predict the packaging task of each stand-alone device.

Here, the first time period is past time, and the second time period is future time.

In this way, the packaging task of each stand-alone device can be automatically generated, providing a basis for the packaging process of each stand-alone device, helping to realize the intelligence of yarn spindle packaging, improve the flexibility of yarn spindle packaging, and thus improve the packaging efficiency of yarn spindles.

Figure 10:
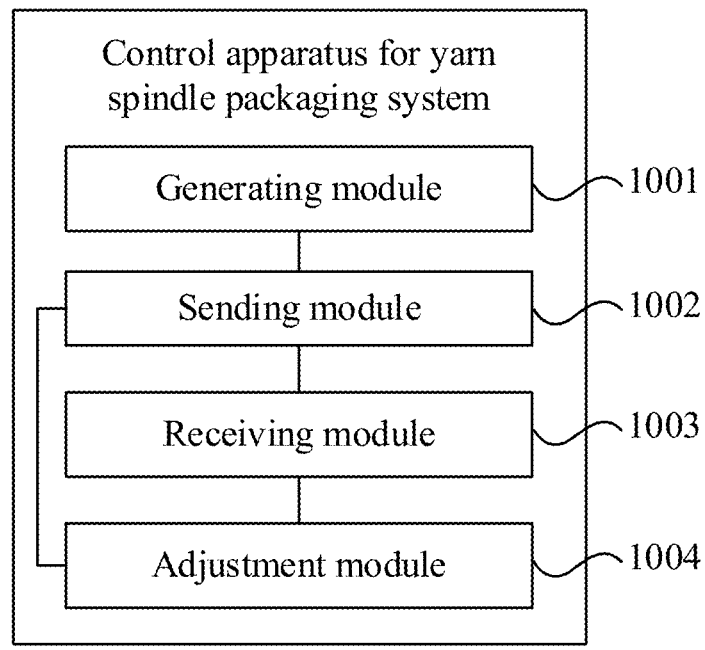
FIG. 10 is a schematic structural diagram of a control apparatus for the yarn spindle packaging system according to an embodiment of the present disclosure.

An embodiment of the present disclosure provides a control apparatus for a yarn spindle packaging system. As shown in FIG. 10, the control apparatus for the yarn spindle packaging system may include:

a generating module 1001 configured to generate a packaging task and a device control parameter of each stand-alone device for a target type of yarn spindles according to a packaging requirement;

a sending module 1002 configured to send the corresponding packaging task and device control parameter to each stand-alone device, so that each stand-alone device executes the corresponding packaging task based on the corresponding device control parameter;

a receiving module 1003 configured to receive work data corresponding to the corresponding packaging task returned by each stand-alone device; and an adjustment module 1004 configured to adjust the packaging task and the device control parameter of each stand-alone device in combination with the work data returned by each stand-alone device, and notify the sending module 1002 to send a corresponding latest packaging task and a corresponding latest device control parameter to each stand-alone device.

Here, the yarn spindle packaging system is the yarn spindle packaging system described in any of the above embodiments.

In some embodiments, the control apparatus for the yarn spindle packaging system further includes: a first control module (not shown in FIG. 10) configured to: when different target types of yarn spindles are not packaged simultaneously, obtain the yarn spindle size information corresponding to a target yarn spindle to be packaged; and adjust a size of a tray according to the yarn spindle size information.

In some embodiments, the control apparatus for the yarn spindle packaging system further includes: a second control module (not shown in FIG. 10) configured to: when different target types of yarn spindles are packaged simultaneously, schedule a trolley and a tray matching with each target type of yarn spindles for packaging each target type of yarn spindles according to a packaging process of each target type of yarn spindles.

In some embodiments, the control apparatus for the yarn spindle packaging system further includes: a third control module (not shown in FIG. 10) configured to generate a first control instruction; and control, based on the first control instruction, each stand-alone device to: when receiving the corresponding latest packaging task, detect whether a current packaging task is completed; continue executing the current packaging task if the current packaging task is not completed; and execute the corresponding latest packaging task based on the corresponding latest device control parameter after completing the current packaging task.

In some embodiments, the control apparatus for the yarn spindle packaging system further includes: a fourth control module (not shown in FIG. 10) configured to generate a second control instruction; and control, based on the second control instruction, each stand-alone device to: when receiving the corresponding latest device control parameter, compare a current device control parameter with the latest device control parameter, determine a device control parameter that needs to be adjusted based on a comparison result, and adjust the device control parameter that needs to be adjusted to meet a requirement of the latest device control parameter.

In some embodiments, the control apparatus for the yarn spindle packaging system further includes: a fifth control module (not shown in FIG. 10) configured to: when receiving an alarm message sent by a stand-alone device, determine a position of a companion work station where yarn spindles in the target batch are stored, and schedule yarn spindles that meet quality and batch requirements for the stand-alone device that sends the alarm message from the position of the companion work station; where the alarm message is used to indicate that the currently processed yarn spindles do not belong to the same batch.

In some embodiments, the control apparatus for the yarn spindle packaging system further includes: a sixth control module (not shown in FIG. 10) configured to: obtain the historical work data of each stand-alone device in a first time period; and input the packaging requirement and the historical work data of each stand-alone device into a packaging task generation model, and obtain the packaging task of each stand-alone device in a second time period output by the packaging task generation model; where the packaging task generation model is obtained by using a historical work data sample and a packaging requirement sample of each stand-alone device for training and is used to predict the packaging task of each stand-alone device.

Those skilled in the art should understand that the functions of the processing modules in the control apparatus for the yarn spindle packaging system in the embodiments of the present disclosure can be understood with reference to the relevant description of the control method for the yarn spindle packaging system, and the processing modules in the control apparatus for the yarn spindle packaging system in the embodiments of the present disclosure may be implemented by an analog circuit that implements the functions in the embodiments of the present disclosure or may be implemented by running software that performs the functions in the embodiments of the present disclosure on an electronic device.

The control apparatus for the yarn spindle packaging system in the embodiments of the present disclosure can generate the packaging task and device control parameter of each stand-alone device for different types of yarn spindles according to the packaging requirement, execute the corresponding packaging task based on the corresponding device control parameter, and realize intelligent packaging of different types of yarn spindles based on the packaging task and device control parameter, improving the intelligence and flexibility of the yarn spindle packaging system, and thereby improving the packaging efficiency of yarn spindles.

According to embodiments of the present disclosure, the present disclosure also provides an electronic device and a readable storage medium.

Figure 11:
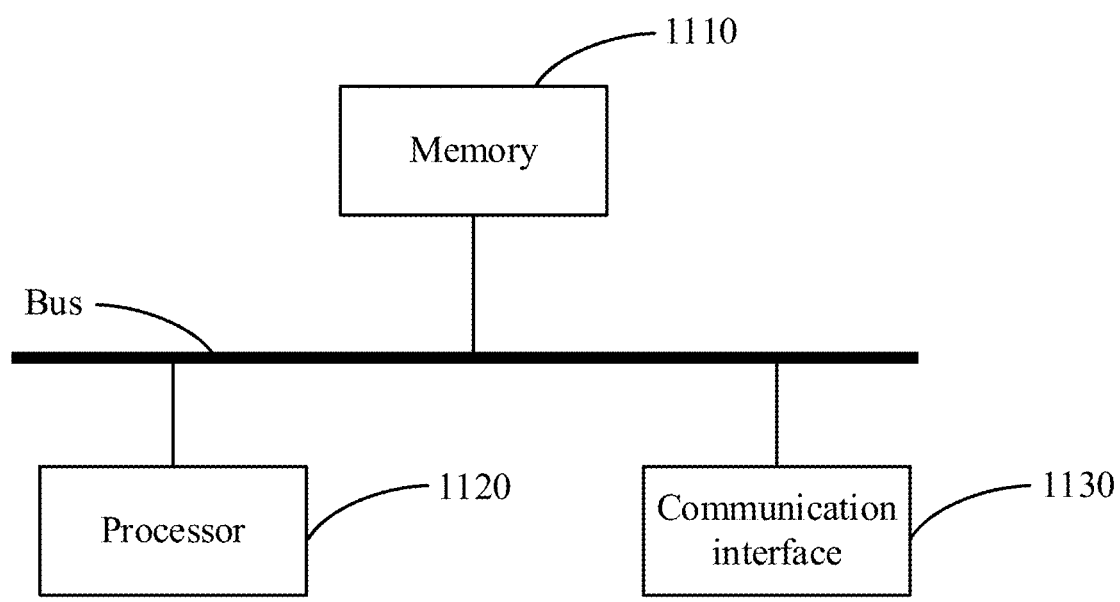
FIG. 11 is a block diagram of an electronic device for implementing the control method for the yarn spindle packaging system according to an embodiment of the present disclosure.

FIG. 11 is a structural block diagram of the electronic device according to an embodiment of the present disclosure. As shown in FIG. 11, the electronic device includes: a memory 1110 and a processor 1120, and the memory 1110 stores a computer program that can run on the processor 1120. There may be one or more memories 1110 and processors 1120. The memory 1110 may store one or more computer programs, and the one or more computer programs cause the electronic device to perform the method provided in the above method embodiment, when executed by the electronic device. The electronic device may also include: a communication interface 1130 configured to communicate with an external device for data interactive transmission.

If the memory 1110, the processor 1120 and the communication interface 1130 are implemented independently, the memory 1110, the processor 1120 and the communication interface 1130 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the buses are represented by only one thick line in FIG. 11, but it does not represent only one bus or only one type of bus.

Optionally, in a specific implementation, if the memory 1110, the processor 1120 and the communication interface 1130 are integrated on one chip, the memory 1110, the processor 1120 and the communication interface 1130 may communicate with each other through an internal interface.

It should be understood that the above-mentioned processor may be a Central Processing Unit (CPU) or other general-purpose processor, a Digital Signal Processing (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

In the description of this specification, it should be understood that the orientations or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axis" 7 , "radial", "circumferential", etc. are orientations or position relationships shown based on the drawings, and are only for the purpose of facilitating the description of the present disclosure and simplifying the description, rather than indicating or implying that the device or element referred to must have a particular orientation or be constructed and operated in a particular orientation, and thus should not be construed as the limitation on the present disclosure.

What is claimed is:

1. A yarn spindle packaging system, comprising: a control device and a plurality of stand-alone devices;
   wherein the control device is configured to generate a packaging task and a device control parameter of each stand-alone device for a target type of yarn spindles according to a packaging requirement; and adjust the packaging task and the device control parameter of each stand-alone device in combination with work data returned by each stand-alone device; and
   each stand-alone device is configured to receive the corresponding packaging task and device control parameter sent by the control device; execute the corresponding packaging task based on the corresponding device control parameter; and return the work data corresponding to the corresponding packaging task to the control device;
   wherein packaging of different target types of yarn spindles is able to share the control device and at least some of the plurality of stand-alone devices.

2. The yarn spindle packaging system of claim 1, wherein the plurality of stand-alone devices at least comprise:
   a robot, a weighing device, an appearance detection device, a bagging device, a palletizing device, a taping device and a shipping mark device.

3. The yarn spindle packaging system of claim 1, wherein the control device is further configured to: when different target types of yarn spindles are not packaged simultaneously, obtain yarn spindle size information corresponding to a target yarn spindle to be packaged; and adjust a size of a tray according to the yarn spindle size information; wherein the tray is configured to insert and receive yarn spindles.

4. The yarn spindle packaging system of claim 1, wherein the control device is further configured to: when different target types of yarn spindles are packaged simultaneously, schedule a trolley and a tray matching with each target type of yarn spindles for packaging each target type of yarn spindles according to a packaging process of each target type of yarn spindles, wherein the trolley is configured to transport yarn spindles to be packaged.

5. The yarn spindle packaging system of claim 1, wherein each stand-alone device is further configured to: when receiving a corresponding latest packaging task, detect whether a current packaging task is completed; continue executing the current packaging task if the current packaging task is not completed; and execute the corresponding latest packaging task based on a corresponding latest device control parameter after completing the current packaging task.

6. The yarn spindle packaging system of claim 1, wherein each stand-alone device is further configured to: when receiving a corresponding latest device control parameter, compare a current device control parameter with the latest device control parameter, determine a device control parameter that needs to be adjusted based on a comparison result, and adjust the device control parameter that needs to be adjusted to meet a requirement of the latest device control parameter.

7. The yarn spindle packaging system of claim 1, further comprising:
   a re-inspection device connected to each stand-alone device, configured to inspect received yarn spindles; and
   a companion work station connected to each re-inspection device, configured to store yarn spindles obtained from the connected re-inspection device according to an inspection result of the connected re-inspection device;
   wherein each stand-alone device is further configured to detect whether currently processed yarn spindles belong to a same batch, and transport all the currently processed yarn spindles to the corresponding re-inspection device or transport yarn spindles not in a target batch to the corresponding re-inspection device if the currently processed yarn spindles do not belong to the same batch.

8. The yarn spindle packaging system of claim 7, wherein the control device is further configured to: when receiving an alarm message sent by a stand-alone device, determine a position of a companion work station where yarn spindles in the target batch are stored, and schedule yarn spindles that meet quality and batch requirements for the stand-alone device that sends the alarm message from the position of the companion work station; wherein the alarm message is used to indicate that the currently processed yarn spindles do not belong to the same batch.

9. The yarn spindle packaging system of claim 1, wherein the control device is further configured to:
- obtain historical work data of each stand-alone device in a first time period; and
- input the packaging requirement and the historical work data of each stand-alone device into a packaging task generation model, and obtain the packaging task of each stand-alone device in a second time period output by the packaging task generation model; wherein the packaging task generation model is obtained by using a historical work data sample and a packaging requirement sample of each stand-alone device for training and is used to predict the packaging task of each stand-alone device.

10. The yarn spindle packaging system of claim 1, wherein the plurality of stand-alone devices comprise a first-type stand-alone device, a second-type stand-alone device, a third-type stand-alone device and a fourth-type stand-alone device; wherein the first-type stand-alone device, the second-type stand-alone device, the third-type stand-alone device and the fourth-type stand-alone device are arranged in different areas; the first-type stand-alone device is a stand-alone device suitable for packaging Draw Textured Yarn (DTY) yarn spindles, the second-type stand-alone device is a stand-alone device suitable for packaging Pre-Oriented Yarn (POY) yarn spindles, the third-type stand-alone device is a stand-alone device suitable for packaging Full Draw Yarn (FDY) yarn spindles, the fourth-type stand-alone device is a stand-alone device suitable for packaging DTY yarn spindles, POY yarn spindles and FDY yarn spindles, and the fourth-type stand-alone device is able to be connected to the first-type stand-alone device, the second-type stand-alone device and the third-type stand-alone device respectively.

* * * * *